(12) United States Patent
Higashi

(10) Patent No.: US 6,710,279 B1
(45) Date of Patent: Mar. 23, 2004

(54) POWER SUPPLY FOR ELECTRIC SPARK MACHINE AND METHOD FOR CONTROLLING THE SAME

(75) Inventor: Hirotaka Higashi, Osaka (JP)

(73) Assignee: Higashi EDM Co., Ltd., Kadoma Osaka (JP)

( * ) Notice: Subject to any disclaimer, the term of this patent is extended or adjusted under 35 U.S.C. 154(b) by 0 days.

(21) Appl. No.: 09/674,255

(22) PCT Filed: Mar. 15, 1999

(86) PCT No.: PCT/JP99/01292

§ 371 (c)(1),
(2), (4) Date: Oct. 30, 2000

(87) PCT Pub. No.: WO99/56905

PCT Pub. Date: Nov. 11, 1999

(30) Foreign Application Priority Data

Apr. 30, 1998 (JP) .......................................... 10/137626

(51) Int. Cl.⁷ ................................................ B23H 1/02
(52) U.S. Cl. ................................................ 219/69.13
(58) Field of Search ........................... 219/69.13, 69.18

(56) References Cited

U.S. PATENT DOCUMENTS

| | | | | |
|---|---|---|---|---|
| 4,201,906 A | * | 5/1980 | Puschner | |
| 4,681,997 A | * | 7/1987 | Inoue et al. | 219/69.13 |
| 4,788,399 A | * | 11/1988 | Mironoff | 219/69.18 |
| 4,940,872 A | * | 7/1990 | Futamura | 219/69.13 |
| 5,111,017 A | * | 5/1992 | Futamura et al. | 219/69.18 |
| 5,645,741 A | * | 7/1997 | Terayama et al. | |

FOREIGN PATENT DOCUMENTS

| | | |
|---|---|---|
| JP | 54-2595 | 1/1979 |
| JP | 54-62595 | 5/1979 |
| JP | 54-164086 | 12/1979 |
| JP | 56-163830 | 12/1981 |
| JP | 57-4452 | 1/1982 |
| JP | 57-138526 | 8/1982 |
| JP | 63-114812 | 5/1988 |
| JP | 4-75822 | 3/1992 |
| JP | 4-82617 | 3/1992 |
| JP | 5-208316 | 8/1993 |
| JP | 5-285730 | 11/1993 |

* cited by examiner

*Primary Examiner*—Geoffrey S. Evans

(57) ABSTRACT

In a power supply apparatus of an electric spark (discharge) machine for generating high frequency pulse by a switching circuit from a DC power supply, stepping up the voltage by a high frequency transformer, generating a dire current by a rectifier, and feeding the DC power to the electric spark gap, the voltage of OP amplifier (221) for detecting an output voltage and an OP amplifier (222) for detecting an output current and converting it to a voltage are inputted to a summation OP amplifier (223). The output voltage and the output current are controlled so as to have a negative proportional linear relation via feedback circuit (220) for performing feedback to a fly-back switching circuit (210) through a voltage comparison/subtraction OP amplifier (224) for comparing and subtracting the sum of the voltages with and from a reference voltage.

6 Claims, 2 Drawing Sheets

POWER SUPPLY FOR ELECTRIC SPARK MACHINE AND METHOD FOR CONTROLLING THE SAME

This application is considered a continuation under 35 U.S.C. 371 of PCT/JP99/01292, filed Mar. 15, 1999, and is now WO99/56905.

FIELD OF THE INVENTION

The present invention relates to the power supply apparatus of the electric spark (discharge) machine. More particularly, the present invention relates to an improved control circuit for a switching circuit of the power supply apparatus, which is applied for any type of intermittent energy-generating block of the electric spark machine.

DESCRIPTION OF THE PRIOR ART

Most of the prior power supply for the electric spark machine were systems transforming the commercial AC power supply by a low frequency transformer, rectifying through the rectifier, restricting the output current by a resistor and supplying to the electrode gap. Recently, the technology for the power supply that it could provide a requested voltage and current by the pulse width control using switching circuit through direct rectification of the commercial AC source and converting it to high frequency pulse was developed. By this technology, the whole of the power supply apparatus becomes smaller and lighter toward the output capacity because it can be applied in the light-weight and the high efficiency high frequency transformer.

Also, technology was developed that reduces the allowable current value of the restricting resistor or it has no resistor, by restricting the output current.

There are Japanese Non-examined Patent Publication No.54-2595, No.57-138526 and No.5-208316 and Japanese Examined Patent Publication No.57-4452 and so on as the typical examples of such prior art. The technology of an intermittent energy-generating block itself for the electric discharge includes a switching element, and applied the restriction of electric discharge current is described in Japanese Examined Patent Publication No.57-4452. However, the relationship corresponding to the output current and the output voltage between the load-less voltage and the electric discharge start voltage is not controlled intentionally in this prior art.

In Japanese Non-examined Patent Publication No.54-2595 and No.57-138526, the intermittent energy-generating block itself for the electric discharge includes a switching element, and the restriction of the electric discharge current is carried out.

In Japanese Non-examined Patent Publication No.5-208316, the switching element is used for two steps, in the first step, it is used for the DC supply, and in the second step, it is used as the intermittent energy-generating block for the electric discharge and the discharge current is restricted. Also a capacitor is used as the intermittent energy-generating block for the electric discharge, and the power is supplied at its previous step by switching element in Japanese Non-examined Patent Publication No.S54-164086.

Moreover, there is the following disadvantage in the method by setting only a current restriction on the usual fixed voltage switching power supply for the electric discharge processing. A certain higher load-less voltage is necessary so that it causes easily a dielectric destruction at the electrode gap, i.e. the electric discharge starts, and it provides to maintain the stable servo control which is so-called stable electric discharge. Therefore, when a usual switching power supply is applied, it is required to provide this high load-less voltage. This had to be designed that all of the power supply elements have larger maximum consumption electric power capability. It obstructs to miniaturize and to lighten the power supply apparatus including the transformer.

There are Japanese Non-examined Patent Publication No.54-62595, No.56-163830, and No.5-285730 and Japanese Examined Patent Publication No.57-4452, and so on as a prior art, which solves these problems. However, all of these prior arts are consist of the combination of low voltage and high voltage power supply block, and then, it obstructs to miniaturize and to lighten the power supply because it is required two different type of the power supply circuits.

Though considerable miniaturization or weight decreasing or higher efficiency of the power supply for the electric spark machine have been developed by the above prior arts, it is important to provide further miniature and light weight power supply. Even in the country or the area where a higher commercial electric voltage is available higher for obtaining a load-less high voltage easily, it is important to control the discharge current and voltage, and to save the electric power consumption.

The object of the present invention is to provide the smaller size, the lighter weight and the more efficient power supply for the electric spark machine. Further object is to find a control circuit which has the characteristics to generate the high voltage so that it controls easily the steady electric discharge by only one switching power supply based on low voltage and large current.

SUMMARY OF THE INVENTION

The object of the present invention is to provide a smaller size and a lighter weight power supply apparatus for the electric spark machine than that of the prior arts. More particularly, the object is to provide a control circuit for a fly-back switching power supply, which has the characteristics to generate the high voltage to start the electric discharge easily by using only one switching power supply for low voltage and large current capacity. Another object is to provide an efficient power supply for the electric spark machine.

According to one of the preferable embodiment of the present invention, above objects are achieved by a control circuit having the feature which comprises controlling an output voltage for an intermittent energy-generation block so that the output voltage varies as the relation of a negative linear proportion against an output current in the range of the output voltage between the load-less voltage and the electric discharge start voltage plus minus 25V.

This control circuit has a feedback function which maintains the difference to be a constant by comparing the voltage of the summation of the output voltage and the voltage converted from the output current value with the predetermined standard voltage.

According to another preferable embodiment of the present invention, above objects are also achieved by a control circuit having the feature which comprises controlling an output voltage for an intermittent energy-generation block so that the output voltage varies as the relation of an inverse proportion against an output current in the range of the output voltage between the load-less voltage and the electric discharge start voltage plus minus 25V. This control circuit has a function that maintains the difference which obtained by comparing the voltage of the product (multiplication) of the output voltage and the voltage converted from the output current value with the predetermined standard voltage to a certain value.

These control circuits result in a reduction of the overall weight and size of the power supply.

A power supply for the electric spark machine of the 250VA output capacity is provided with about 1000 cubic cm in volume and about 1 Kg in weight by the present invention. By the prior technology of the combination with the low frequency transformer and the restriction resistor, it is about 4000 cubic cm in volume and about 10 Kg in weight. By the prior technology of the combination with two switching power supplies of high voltage and low voltage is about 2000 cubic cm in volume and about 2 Kg in weight.

Further, although it requires that each circuit component have 900VA capability by the combination of prior transformer and the restricting resistor in the case of manufacturing a power supply which has the load-less voltage of 180V and the output current capacity of 5A, in the case of the negative proportional relation of the present invention, since the maximum consumption of the power is about 311VA, all circuit components may be allowed to have only 311VA capability, also in the case of the inverse proportional relations of the present invention, since the maximum output voltage which corresponds the maximum output current 5A is about 50V, all circuit components may be allowed to have only 250VA capability, this results a higher efficient power supply. Many other features, advantages and additional objects of the present invention will become manifest to those versed in the art upon making reference to the detailed description which follows and the accompanying sheet of drawings.

DETAILED DESCRIPTION OF THE INVENTION

It is well known that a certain high voltage is required for the power supply to start the electric discharge on the gap between the work and the electrode. Also the power supply requires large current capability to maintain the intermittent electric discharge. Thus, each component of the circuit requires both high voltage and large current capability. It results large size and heavy weight power supply apparatus.

The advantage of the power supply which supplies relatively high voltage in the small current region and relatively low voltage in the large current region is understood. Thus, a control circuit which controls the switching circuit so that the output voltage for the intermittent energy-generation block varies as a negative linear proportion or an inverse proportion against the output current is provided for this purpose.

The argument of the control circuit for a negative linear proportion as follows:
obtaining the summation of the output voltage and the voltage converted from the detected output current, which is supplied to the intermittent energy-generating block;
comparing the summation voltage and the predetermined voltage by a comparing circuit; and
operating feedback the difference voltage of the summation voltage and the predetermined voltage to the fly-back switching circuit so that the difference voltage maintains a constant.

Resulting a negative proportion relation is understood by following equations.

S−D=Constant i.e. S=D+Constant

S=Y+X i.e. Y=−X+D+Constant

Where, S is the summation of the voltage; D is the predetermined voltage; Y is the output voltage; and X is the voltage converted from the output current.

Since D is also a constant value, Y (i.e. output voltage) varies as a negative linear proportion by X (i.e. the voltage converted from the output current).

Also the argument of the control circuit for an inverse proportion as follows:
obtaining the product (multiplication) of the output voltage and the voltage converted from the detected output current, which is supplied to the intermittent energy-generating block;
comparing the product (multiplication) voltage and the predetermined voltage set in advance by a comparing circuit; and
operating feedback the difference voltage of the product (multiplication) voltage and the predetermined voltage to the fly-back switching circuit so that the difference voltage maintains a constant.

Resulting an inverse proportion relation is understood by following equations.

P−D=Constant i.e. P=D+Constant

P=Y×X i.e. Y=(D+Constant)/X

Where, P is the product (multiplication) of the voltage; D is the predetermined voltage; Y is the output voltage; and X is the voltage converted from the output current.

Since D is also a constant value, Y (i.e. output voltage) varies as an inverse proportion by X (i.e. the voltage converted from the output current).

Also, the combined control circuit with above summation and above product may apply for this purpose if it is not inconvenient for a relative complex circuit.

The term "intermittent energy-generating block for the electric discharge" used herein, it means the element which has the function that it generates and supplies an electric energy to the electrode gap intermittently, for example, such as a capacitor, a capacitor and a coil, and a switching circuit combined an oscillation circuit with a transistor, a FET, a thyristor and so on.

Also, the term "output voltage" used herein, it means the voltage supplied to the intermittent energy-generating block for the electric discharge. As for the term "output current", it means the electric current between the high frequency rectification block and the intermittent energy-generating block for the electric discharge.

If the impedance value of the intermittent energy-generating block for the electric discharge is not so large, the output voltage and the output current are nearly equal to the so-called electrode gap voltage and electric discharge current respectively.

Further, the term "output voltage" and "output current" used herein, it means so-called average voltage and average current respectively.

Generally, though so-called "steady electric discharge voltage range" in the electric discharge processing is varied by the kind of the processing liquid or the electrode material, it is about 40V plus-minus 15V. Therefore, it is prefer to use a high frequency transformer which winding ratio provides the maximum efficiency in near about 40V as the output transformer.

From the conception of the usual transformer for example, although it is thought a difficulty that it gets the output voltage of 180V by using the high frequency transformer of the winding ratio that it gets the output voltage of 40V from the input voltage of 140V, however, it can be done easily to generate a higher output voltage than the input voltage to use a fly-back switching circuit without regard to the winding ratio of the transformer. This technology doesn't cause a wrong influence on the process of electric spark machine processing even in the country or the area that the input voltage is 180V or more.

The fly-back switching circuit is based on the polarity reversal of the high frequency transformer and the output voltage generates at off time of the switching transistor, it generates a wide range of optional high voltage by adjusting the ratio of the on/off time of the switching.

The technology of restricting an electric discharge current is a well-known technology. This prior art also can be applied for the present invention, as the restricted current value is near value which is less than allowable value for the high frequency transformer.

The relationship between the output voltage and the output current in the range from the load-less voltage to near the electric discharge start voltage may be a negative linear proportion or an inversely proportion, but it may not be completely strict.

FIG. 1 shows the relationship between the output voltage and output current, as the vertical axis is the output voltage and the horizontal axis is the output current, including the difference from the prior art.

Solid straight-line Vo-A-M shows that the switching circuit is controlled as that the output voltage changes as a negative linear proportion against the output current in the present invention. It may allow to be some upper vending curve relation (Dotted line Vo-A'-M), however, it is not desirable because it comes off the relation which provides originally a high voltage at low current and a low voltage at large current when it is extreme offlying.

On the other hand, where the switching circuit is controlled as that the output voltage changes as an inversely proportion, (Solid line Vo-B-M) against the output current in the present invention, it allows to be applied without trouble because the required function is provided to generate substantially higher voltage even if the relation is extreme close to the hyperbola. (Dotted line Vo-B'-M)

The range of the output voltage that the output voltage varies a negative linear proportion or inverse proportion against the output current may be between load-less (open) voltage and near the electric discharge starting voltage. However, if the bottom limit voltage of the output voltage is too high, it is not preferable because it requires higher capacity of elements for the power supply apparatus at large current.

Contrary, if the bottom limit voltage of the output voltage is too low, it is not desirable because the current value at the steady electric discharge stage falls down under desired value.

Finally, the preferable controlling range of the output voltage, which is expected the result of miniaturization or the lightening weight, is between the load-less voltage and the voltage of the electric discharge start voltage plus-minus 25V. (The part C of the FIG. 1)

Further, the alternate long and short line F of the FIG. 1 shows the relationship between the output voltage and the output current where the switching power supply is combined with a switching power supply for low voltage-large current and high voltage-small current as the prior art. The current restriction resistor is required to obtain the relation of a negative linear proportion between the electrode gap voltage and electric discharge current if it is used the prior low frequency transformer.

When the electrode gap resistance is short circuit or becomes small value like short circuit, large current flows unless the current restriction is carried out, and to cope with it, the larger power supply apparatus is required because the transformer and the restriction resistor of the large capacity should be necessary in this prior art.

The principle to control the switching circuit according to the present invention is described as follows.

First, the load-less voltage is set to the requested voltage. While decreasing the distance between the gap, once the electric discharge starts, then the current starts to flow and the above mentioned voltage of summation (or product) exceeds the predetermined standard voltage, then the equivalent quantity of the voltage converted from the current makes feedback as to short T-on for the switching so that the output voltage start to decrease. This trend maintains the relation of the negative proportion (or inverse proportion) that the output voltage is decreasing against the current is increasing.

It is preferable to use an OP amplifier for the addition operation circuit to obtain the summation of the voltage and to use an OP amplifier for multiplication operation to obtain the product of the voltage respectively. However, other circuit elements may be applied, if it has similar function.

The current restriction circuit is set separately. This circuit may be an OP amplifier, a three-terminal regulator, and like this. The setting is carried out so that the current restriction starts. The output voltage that the current restriction is started, can be set optionally by changing resistor value for converting the detected current to the voltage, and so on.

The element of the intermittent energy-generating block for the electric discharge in the present invention, may be applied any of a capacitor or the combination with a capacitor and an inductance, or the combination with the oscillation circuit and a transistor, a thyristor, a FET (Field Effect Transistor), and so on.

Vo=load-less voltage

Vs=electric discharge starting voltage

Is=designated current restricting value

M=current restriction starting voltage

C=Voltage range Vs plus-minus 25V

Figure 1:
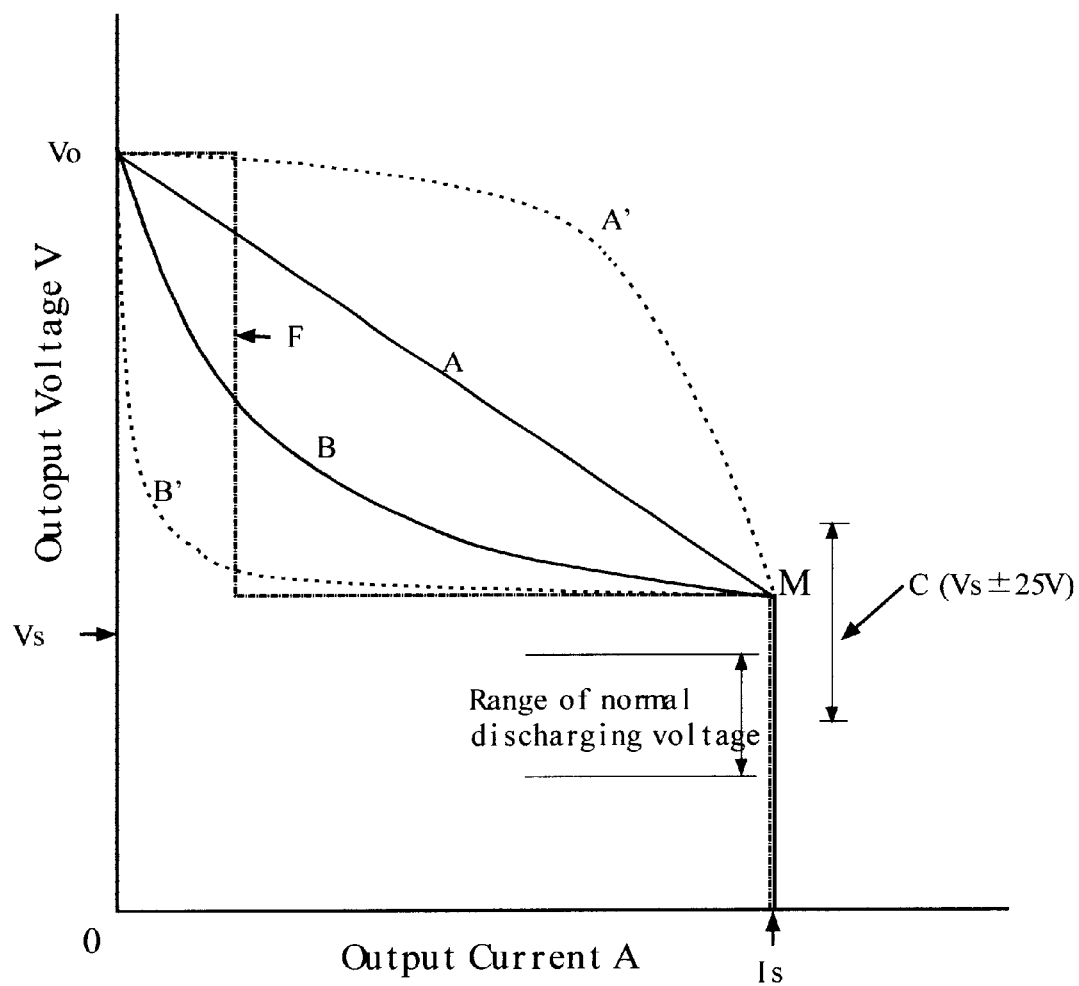
FIG. 1 shows the graph on the relations between the output voltage and the output current of the present invention including the comparative example that the relations in the case of the switching power supply for the low voltage and high voltage is combined in the prior arts. The meaning of the mark shown in the graph is as follows.
Figure 2:
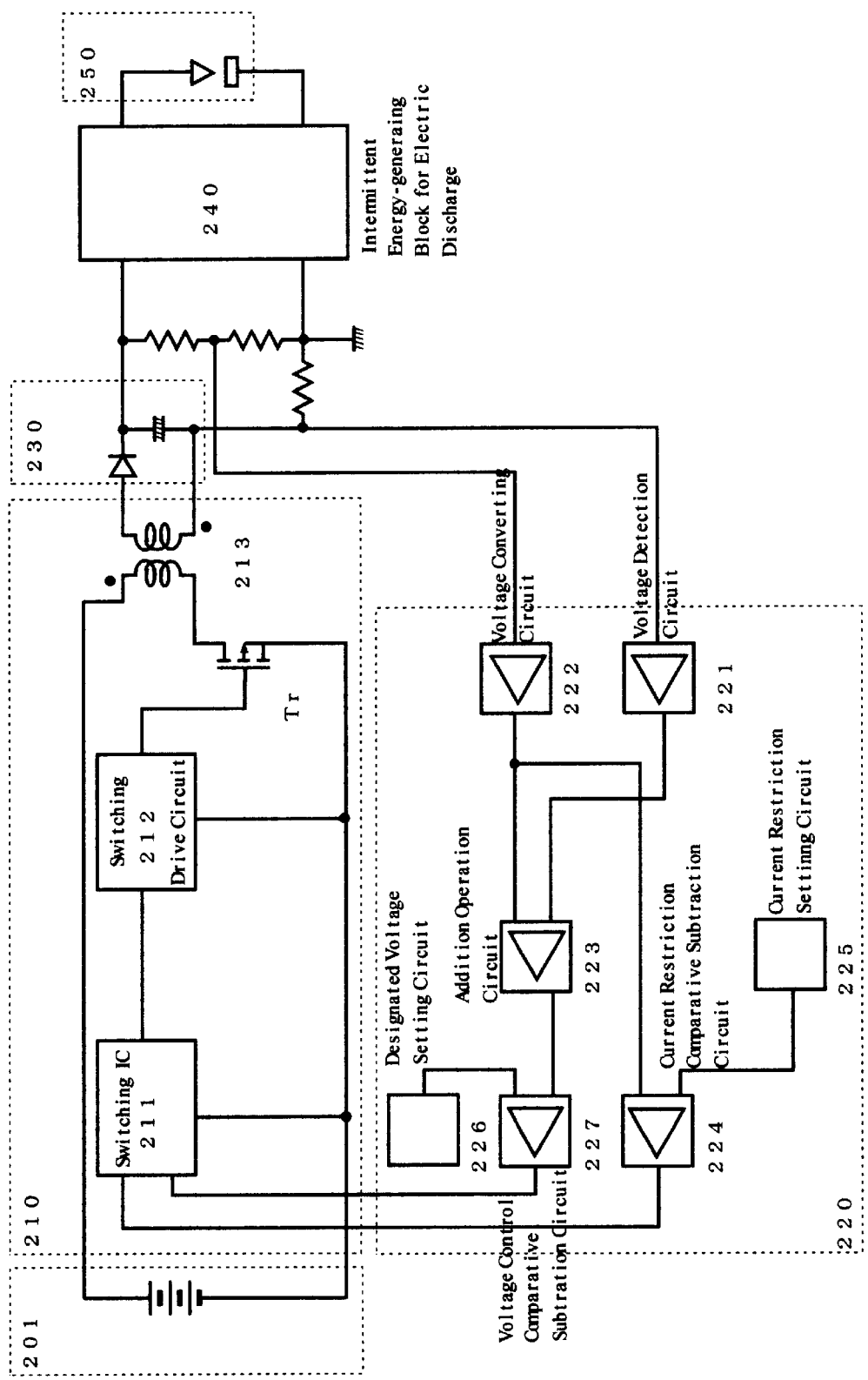

FIG. 2 shows the outline of the circuit block diagram of the present invention.

PREFERABLE EMBODIMENT

The present invention is explained in detail based on the embodiment shown in the drawings in followings.

FIG. 2 shows the outline circuit block diagram of the present invention.

The circuit blocks of the present invention consist of a fly-back switching circuit block 210 which includes a switching control circuit 211 in front step and a switching drive circuit 212; a switching transistor Tr and a high frequency transformer 213; a feedback circuit block 220 which consists of an output voltage detection circuit 221, an output current detection and a voltage converting circuit 222, an addition operation circuit 223, a current restriction comparative subtraction circuit 224, a current restriction setting circuit 225, a predetermined voltage setting circuit 226, and a voltage control comparative subtraction circuits 227; a high frequency rectification block 230; an intermittent energy-generating block for electric discharge 240 for electric discharge; and an electrode gap 250. This supplies a DC or a pulse power to the electrode gap 250 through the intermittent energy-generating block 240.

The fly-back switching circuit block 210 is preferable that it is composed of a switching control circuit 211 which controls the pulse width of T-on and T-off for the corresponding value inputted the feedback voltage at the front step, a driving circuit block 212 which drives a transistor Tr for the switching, a switching transistor Tr and a high frequency transformer 213.

The number of the transistor Tr for the switching may increase to the plurality in parallel depending on the amount of required current.

The feedback block 220 of the present invention is preferable that it is composed of an operation (OP) amplifier 221 for the voltage detection circuit which takes out the voltage after the high frequency rectification of the front step as an output voltage from an intermittent energy-generating block 240 for the electric discharge by a resistor for the voltage measurement, an OP amplifier 222 for the current detection that takes out as the output current between a high frequency transformer 213 and an intermittent energy-generating block 240 for the electric discharge by a resistor for the current measurement and converts to the voltage, an OP amplifier 223 for the addition operation that adds these voltages, an OP amplifier 227 for the voltage comparative subtraction that makes comparative subtraction with a designated voltage 226 set by a variable resistor, an OP amplifiers 227 for the current comparative subtraction with a restriction current value circuit 225 set in advance.

The difference of the voltage of OP amplifier 227 and the signal of OP amplifier 224 makes feedback to a switching control circuit 211 for the switching control.

Further, in this embodiment the voltage of the difference set to be a constant is set in zero volt (0V), and the bottom limit of the output voltage that the negative linear proportion is stopped is set in 50V, which corresponds with the voltage that the current restriction is starting.

A high frequency transformer 213 adapted to the present invention is preferable that the allowable current value is larger than a designated restriction current value from the point of the converting efficiency of the transformer.

Also, the winding ratio for input/output of the high frequency transformer 213 is preferable near (85/65) so that it becomes the value of the maximum steady electric discharge voltage (generally, about 65V) toward the required or available minimum load-less input voltage (generally, about 85V) as for the country or the area where the available commercial AC voltage is 100V. As for the country or the area where the available commercial AC voltage is 240V, the winding ratio is preferable as (204/65).

The high frequency rectification block 230 adapted to the present invention, has no special restriction and it may be used a diode for the high frequency and the capacitor for smoothing the ripple in usual, and may be added an inductor in series if necessary.

Moreover, as for an intermittent energy-generating block 240 for the electric discharge, there is no restriction as well, they may be any of a capacitor, a combination of a capacitor and a coil, or a combination of an oscillation circuit and a transistor, a FET, a thyristor, and so on, if it has the function which can supply intermittently an electric charge for the electric discharge which becomes momentary zero after the electric discharge to the gap 250 between the electrode and the work to be processed. A capacitor is used to function as an intermittent energy-generating block 240 for the electric discharge in this embodiment.

In another embodiment of the present invention, that the output voltage varies in an inverse proportion against the output current it the range of output voltage between the load-less voltage and the electric discharge start voltage plus-minus 25V, only the addition operation OP amplifier 223 of the feedback block 220 is replaced by an OP amplifier for multiplication, and the others may be the same as the feedback block 220 in the above mentioned summation circuit in FIG. 2.

Also for the other blocks, it may be the same composition as the case of above circuit for summation.

Where it is not enough for the requested power supply capacity with one power supply of the present invention, it can cope with this case that the plural power supply for the electric discharge of the present invention connects simply in parallel to the intermittent energy-generating block 240 for the electric discharge. Also it is possible to cope with the case that it applies either of the control circuit adopted the above voltage of the summation or the multiplication of the present invention by controlling the plural of switching circuit block 210.

The entire elements and electric or electronic parts described above are available commercially in Japan.

Availability for Industry

By the present invention, it can be available to obtain the load-less output voltage of about 180V from the DC supply rectified the commercial AC power supply of about 100V and the power supply for the electric spark machine of the 250VA output capacity is able to provide about 1000 cubic cm in volume and about 1 Kg in weight.

On the other hand, by the prior technology of the combination with the transformer and the restriction resistor, it is about 4000 cubic cm in volume and about 10 Kg in weight, and by the prior technology of the combination with two power supplies of high voltage and low voltage is about 2000 cubic cm in volume and about 2 Kg in weight. It is very advantageous especially for the portable type electric spark machine.

Further, in the case of producing the power supply of a load-less voltage 180V and an output allowable current 5A, it is necessary that each circuit element copes with 900VA capacity in the prior combination of the transformer and the restriction resistor, however in the present invention, it is more efficient because each circuit element composes with 250VA capacity.

Also because the present invention can be applied in the country or the area where the available commercial AC voltage is higher than 100V, it is possible to make lighter weight of the power supply as well.

While the preferred embodiment has been described, variations thereto will occur to those skilled in the art within the scope of the present inventive concepts which are delineated by the following claims.

What is claimed is:

1. A control method of a switching circuit for an electric spark machine to obtain a relation of a negative linear proportion between an output voltage and an output current of an intermittent energy-generation block for the electric discharge, comprising the step of:

getting a summation of said output voltage and a voltage converted from said output current;

comparing said summation with a designated voltage set in advance; and controlling a difference of said summation and said designated voltage so that said difference maintains a constant.

2. A control method of a switching circuit for an electric spark machine to obtain a relation of an inverse proportion between an output voltage and an output current of an intermittent energy-generation block for the electric discharge, comprising the step of:

getting a product of said output voltage and a voltage converted from said output current;

comparing said product with a designated voltage set in advance; and controlling a difference of said product and said designated voltage so that said difference maintains a constant.

3. A power supply for an electric spark machine having an electrode and a workpiece, comprising:

a DC power supply;

a fly-back switching circuit;

a feedback block;

an intermittent energy generation block for connecting to the electrode and the workpiece;

wherein said feedback block sends at least one signal to the flyback switching circuit to control the output voltage and output current of the intermittent energy generation block so that there is an inverse proportion between the output voltage and the output current, the range of the output voltage being between a load less voltage and an electric discharge start voltage, plus or minus 25 volts.

4. The power supply as claimed in claim 3, wherein the inverse proportion is linear.

5. The power supply as claimed in claim 3, wherein the flyback switching circuit further comprises a current restricting circuit that limits the output current for said intermittent energy generation block to a set value.

6. The power supply as claimed in claim 4, wherein the flyback switching circuit further comprises a current restricting circuit that limits the output current for said intermittent energy generation block to a set value.

* * * * *